(12) United States Patent
Barberis et al.

(10) Patent No.: US 7,738,620 B2
(45) Date of Patent: Jun. 15, 2010

(54) METHOD OF MANUFACTURING A FUEL CLADDING TUBE FOR A NUCLEAR REACTOR, AND A TUBE OBTAINED THEREBY

(75) Inventors: Pierre Barberis, Ugine (FR); Jean-Paul Mardon, Caluire (FR); Véronique Rebeyrolle, Duingt (FR); Jean-Luc Aubin, St Brevin (FR)

(73) Assignee: Areva NP, Courbevoie (FR)

( * ) Notice: Subject to any disclaimer, the term of this patent is extended or adjusted under 35 U.S.C. 154(b) by 285 days.

(21) Appl. No.: 11/659,656

(22) PCT Filed: Jul. 19, 2005

(86) PCT No.: PCT/FR2005/001844

§ 371 (c)(1),
(2), (4) Date: Aug. 16, 2007

(87) PCT Pub. No.: WO2006/027436

PCT Pub. Date: Mar. 16, 2006

(65) Prior Publication Data

US 2008/0080660 A1 Apr. 3, 2008

(30) Foreign Application Priority Data

Aug. 4, 2004 (FR) .................................. 04 08637

(51) Int. Cl.
*G21C 3/00* (2006.01)
(52) U.S. Cl. ........................ 376/409; 376/457; 148/672; 148/421; 420/422
(58) Field of Classification Search ................. 376/409, 376/457; 148/672, 421; 420/422
See application file for complete search history.

(56) References Cited

U.S. PATENT DOCUMENTS 4,649,023 A 3/1987 Sabol et al.

(Continued)

FOREIGN PATENT DOCUMENTS

JP 08253828 10/1996

(Continued)

OTHER PUBLICATIONS

PCT International Search Report PCT/FR2005/001844, mailed Nov. 28, 2005.

(Continued)

*Primary Examiner*—Rick Palabrica
(74) *Attorney, Agent, or Firm*—Davidson, Davidson & Kappel, LLC

(57) ABSTRACT

A method for production of a fuel cladding tube for a nuclear reactor, characterized by the preparation of an ingot of an alloy of zirconium with the following composition by weight %: $0.8\% \leq Nb \leq 2.8\%$, $traces \leq Sn \leq 0.65\%$, $0.015\% \leq Fe \leq 0.40\%$, $C \leq 100$ ppm, $600$ ppm $\leq O \leq 2300$ ppm, $5$ ppm $\leq S \leq 100$ ppm, $Cr+V \leq 0.25\%$, $Hf \leq 75$ ppm and $F \leq 1$ ppm the remainder being zirconium and impurities arising from production. The ingot is then subjected to forging, a hardening and thermomoechanical treatments comprising cold laminations separated by intermediate annealing, all intermediate annealings being carried out at a temperature below the $\alpha \rightarrow \alpha+\beta$ transition temperature of the alloy, finishing with a recrystallization annealing and resulting in the production of a tube, whereupon an optional external cleaning of the tube is carried out and a mechanical polishing of the external surface of the tube is carried out to give a roughness Ra less than or equal to 0.5 μm. The invention further relates to a fuel cladding tube obtained thereby.

15 Claims, 1 Drawing Sheet

U.S. PATENT DOCUMENTS

| | | |
|---|---|---|
| 5,483,563 A | 1/1996 | Herb |
| 5,912,935 A | 6/1999 | Isobe et al. |
| 6,261,516 B1 | 7/2001 | Jeong et al. |
| 6,524,169 B1 | 2/2003 | Anderson et al. |

FOREIGN PATENT DOCUMENTS

| | | |
|---|---|---|
| WO | WO 97/05628 | 2/1997 |
| WO | WO 00/36170 | 6/2000 |
| WO | WO 01/24193 | 4/2001 |
| WO | WO 01/24194 | 4/2001 |
| WO | WO 01/61062 | 8/2001 |

OTHER PUBLICATIONS

Isobe et al., "Development of Highly Corrosion Resistant Zirconium-Base Alloys", Zirconium in the Nuclear Industry: Ninth Symposium, No. 1132, 1991, pp. 346-367.

Schemel et al., "Influence of the Manufacturing Process on the Corrosion Resistance of Zircaloy-4 Cladding", Zirconium in the Nuclear Industry: Ninth Symposium, No. 1023, 1989, pp. 141-152.

Ogata et al., "A Systematic Survey of the Factors Affecting Zircaloy Nodular Corrosion", Zirconium in the Nuclear Industry: Ninth Symposium, No. 1023, 1989, pp. 291-314.

METHOD OF MANUFACTURING A FUEL CLADDING TUBE FOR A NUCLEAR REACTOR, AND A TUBE OBTAINED THEREBY

FIELD OF THE INVENTION

The invention relates to the field of manufacturing zirconium alloy elements used in the reactors of nuclear power stations, in particular fuel cladding tubes.

BACKGROUND OF THE INVENTION

Zirconium alloy elements used in pressurized water reactors for nuclear power stations, in particular those used to make the cladding tubes for fuel pellets, need to present characteristics of high levels of resistance to various types of corrosion. In particular generalized corrosion in media containing lithium and media not containing lithium needs to be taken particularly into consideration.

Various solutions to this problem have been proposed.

Document EP-B1-0 840 931 proposes using quaternary alloys, i.e. alloys of zirconium containing significant quantities of three alloying elements, namely 0.8% to 1.8% niobium, 0.2% to 0.6% tin, and 0.02% to 0.4% iron (where all these percentages, are percentages by weight, as are the percentages throughout the description below).

In such alloys, the carbon content must be maintained in the range 30 parts per million (ppm) to 180 ppm, the silicon content in the range 10 ppm to 120 ppm, and the oxygen content in the range 1600 ppm to 1800 ppm. The composition may be associated with a special thermomechanical treatment method.

Document EP-B1-1 149 180 also proposes such quaternary alloys comprising 0.5% to 1.6% niobium, 0.3% to 0.6% iron, and 0.65% to 0.85% tin, possibly together with 50 ppm to 120 ppm of silicon and possibly 500 ppm to 1600 ppm of oxygen.

SUMMARY OF THE INVENTION

An object of the invention is to propose tubes for cladding nuclear reactor fuel pellets that present properties of resistance to corrosion that are even better than those that have been known up until now, in particular on being exposed to very high temperatures, of the order of 900° C. to 1400° C. These temperatures can be encountered during accidents that lead to a loss of coolant fluid.

To this end, the invention provides a method of manufacturing a fuel cladding tube for a nuclear reactor, the method being characterized by the steps of:
  preparing an ingot of zirconium alloy having the following composition in percentages by weight:
    $0.8\% \leq Nb \leq 2.8\%$;
    traces$\leq Sn \leq 0.65\%$;
    $0.015\% \leq Fe \leq 0.40\%$;
    $C \leq 100$ ppm;
    600 ppm$\leq O \leq 2300$ ppm;
    5 ppm$\leq S \leq 100$ ppm;
    $Cr+V \leq 0.25\%$;
    $Hf \leq 75$ ppm; and
    $F \leq 1$ ppm;

the balance being zirconium and impurities that result from preparation;
  forging the ingot followed by quenching, drawing, and thermomechanical treatments including cold rolling with intervening intermediate annealing, all of the intermediate annealing operations being performed at a temperature below the $\alpha \rightarrow \alpha + \beta$ transus temperature of the alloy, and terminating with recrystallization annealing and obtaining a tube;
  optionally descaling the outside surface of said tube; and
  performing mechanical polishing of said outside surface to give it roughness Ra less than or equal to 0.5 micrometers (μm).

The sulfur content of the ingot preferably lies in the range 8 ppm to 35 ppm.

The oxygen content of the ingot preferably lies in the range 900 ppm to 1800 ppm.

The iron content of the ingot preferably lies in the range 0.020% to 0.35%.

The roughness Ra conferred to the outside surface of the tube after polishing is preferably less than or equal to 0.3 μm.

Preferably, the inside surface of the tube is also subjected to mechanical polishing.

This mechanical polishing preferably confers roughness Ra on the inside surface of the tube that is less than or equal to 0.4 μm.

The invention also provides a fuel cladding tube for a nuclear reactor, the tube being characterized in that its composition is:
  $0.8\% \leq Nb \leq 2.8\%$;
  traces$\leq Sn \leq 0.65\%$;
  $0.015\% \leq Fe \leq 0.40\%$;
  $C \leq 100$ ppm;
  600 ppm$\leq O \leq 2300$ ppm;
  5 ppm$\leq S \leq 100$ ppm;
  $Cr+V \leq 0.25\%$;
  $Hf \leq 75$ ppm; and
  $F \leq 1$ ppm;

the balance being zirconium and impurities that result from preparation; and
  its outside surface has roughness Ra less than or equal to 0.5 μm, obtained by mechanical polishing.

Its sulfur content preferably lies in the range 8 ppm to 35 ppm.

Its oxygen content preferably lies in the range 900 ppm to 1800 ppm.

Its iron content preferably lies in the range 0.020% to 0.35%.

The outside surface of the tube preferably has roughness Ra that is less than or equal to 0.3 μm.

The inside surface of the tube preferably has roughness Ra that is less than or equal to 0.4 μm, obtained by mechanical polishing.

The invention relies on a method of manufacturing tubes having several aspects:
  an optimized composition for the main elements of the alloy, niobium, tin, iron, oxygen, and also for carbon and sulfur;
  obtaining very low hafnium and fluorine contents in the final product;
  a thermomechanical treatment scheme having its various operations performed at relatively low temperatures, and including a final recrystallization treatment; and
  after the final heat treatment and possible descaling, undertaking mechanical polishing for the purposes firstly of removing all traces of fluorine from the outside surface of the tube, and secondly for conferring very low roughness Ra to said surface, the roughness being less than 0.5 μm, and preferably less than 0.3 μm.

BRIEF DESCRIPTION OF THE DRAWINGS

The invention will be better understood on reading the following description given with reference to the following accompanying figures.

DETAILED DESCRIPTION

The zirconium alloy used in the method of the invention must be suitable for ensuring that the tubes have excellent ability to withstand corrosion in an aqueous medium, in particular at very high temperatures of the order of 900° C. to 1400° C. that might be encountered during an accident involving loss of coolant fluid.

According to an embodiment of the invention, the alloy has the following characteristics.

Its niobium content is 0.8% to 2.8% in order to obtain good resistance to corrosion and to hydriding under normal conditions of operation of the reactor.

Its tin content lies between traces and 0.65%. Since the usual detection threshold for this element is about 30 ppm, it must be understood that the tin content can go down to values that are that low. Above 0.65%, there is a risk of degrading corrosion resistance under normal operating conditions of the reactor.

Figure 1:
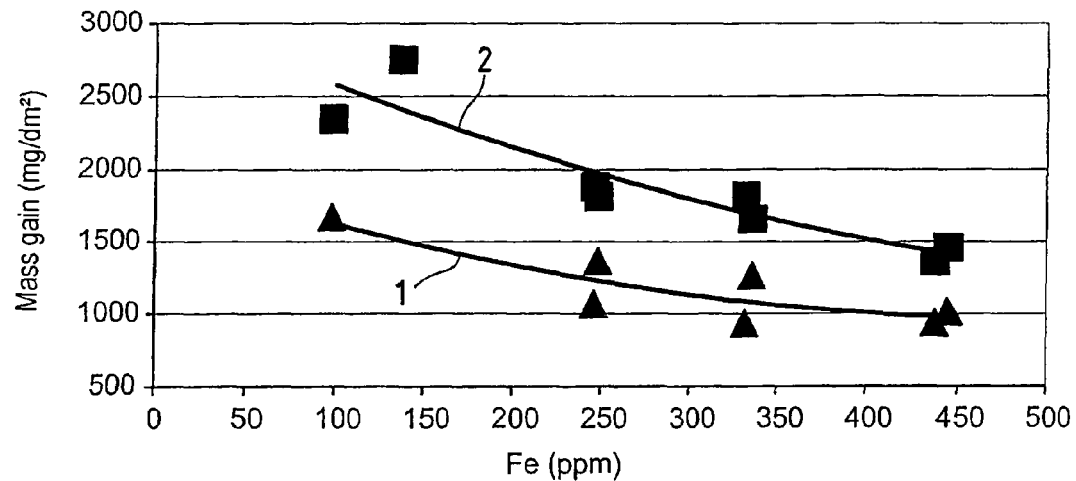
FIG. 1 shows the mass gain of alloy samples having various iron contents when performing oxidation tests in air at 1000° C.

Its iron content is not less than 150 ppm, and preferably not less than 200 ppm, and not more than 0.40%, preferably not more than 0.35%. As shown in FIG. 1, the influence of iron on the corrosion behavior at high temperature is significant, even at minimal concentrations. This figure shows the mass gains (in milligrams per square decimeter ($mg/dm^2$)) of samples having the following composition:

28 ppm $\leq$ C $\leq$ 58 ppm;
32 ppm $\leq$ Hf $\leq$ 47 ppm;
0.94% $\leq$ Nb $\leq$ 1.05%;
927 ppm $\leq$ O $\leq$ 1467 ppm;
10 ppm $\leq$ S $\leq$ 34 ppm;
Sn $\leq$ 47 ppm; and
F < 1 ppm;

as a function of iron content (in ppm) measured during oxidation testing in air at 1000° C. and after 22 minutes (curve 1) and 30 minutes (curve 2). It can be seen that even for very low concentrations of iron, the influence of this element is significant. Starting from 150 ppm of iron, or better 200 ppm, the mass gain, which represents corrosion sensitivity, decreases significantly.

Nevertheless, it is not desirable for the iron content to exceed 0.40%. Above that the creep behavior of the material is degraded, and possibly also its corrosion resistance, at the normal operating temperatures of the reactor (e.g. 300° C. to 360° C.). An increase in hydriding is also to be feared.

The carbon content of the alloy must not exceed 100 ppm in order to retain good resistance to corrosion.

The alloy contains 600 ppm to 2300 ppm of oxygen, preferably 900 ppm to 1800 ppm, to obtain good mechanical behavior and good resistance to creep.

The sulfur content should be maintained in the range 5 ppm to 100 ppm, and preferably in the range 8 ppm to 35 ppm, in order to achieve good creep behavior.

Chromium and vanadium may optionally be present, providing the sum of their contents does not exceed 0.25%.

Two other elements must necessarily be taken into consideration: hafnium and fluorine.

The presence of hafnium within the alloy is to be avoided. It turns out that this element has a significant influence on the corrosion behavior of the alloy under extreme temperature conditions. It is present in zirconium minerals and must be separated therefrom when preparing the zirconium sponge, since, as is known, it constitutes a brake on neutron penetration. It is normally considered that zirconium sponge should not contain more than 100 ppm of hafnium when it is to be used for manufacturing an alloy for nuclear use. In the invention, this content must be even lower, such that in the final alloy there is not more than 75 ppm of hafnium. Special care must therefore be given to separating out hafnium while preparing the zirconium sponge from which the alloy is manufactured.

The fluorine present within the alloy also has an influence on its corrosion behavior under extreme temperature conditions. This content must be limited to a maximum of 1 ppm. Methods of preparing zirconium sponge for manufacturing alloys and that are based on electrolysis in a fluoride bath are to be avoided, since fluorine compounds can become trapped in crystals as they form.

Another very important requirement is the absence of fluoride at the surface of the alloy.

Such fluorides are conventionally present, particularly when the tube has been subjected to descaling in a solution containing hydrofluoric acid. Fluorides are known for producing white marks during corrosion in an autoclave, e.g. at 400° C. under steam at a pressure of 10.5 megapascals (MPa). That is why the ASTM-G2 standard governing corrosion tests recommends effective rinsing in a mixture of alcohol and acetone after descaling in order to eliminate traces of residual fluorides, in particular NaF and KF.

However, the inventors have found that zirconium alloy samples prepared in this way, even with careful rinsing, nevertheless present heterogeneous type corrosion on being raised to high temperature (900° C. to 1050° C.) in air. In the presence of steam this phenomenon is even more marked. Such samples tested at 400° C. in an autoclave under 10.5 MPa of steam, present corrosion that is uniform.

The inventors have also found that similar samples that have not been subjected to descaling and that have not been subjected to rinsing do not present these phenomena of localized corrosion at high temperature, and also that they behave very well on testing in an autoclave.

It turns out that the usual rinsing, even when performed with care, does not enable all of the fluorides that remain on the outer surface to be eliminated. It is probably the remaining fluorides that contribute to the heterogeneous corrosion of the samples at high temperature.

It is therefore absolutely essential, in order to solve the problem on which the invention is based, to use surface preparations that lead to radical elimination of fluorides. From this point of view, performing mechanical polishing in addition to or instead of chemical descaling is the most suitable method of preparing the surface of the tube before it is used. Electrolytic polishing of the kind usually performed in a solution of hydrofluoric and nitric acid is, in contrast, unsuitable since the traces of fluorine at the surface of the tube cannot subsequently be eliminated sufficiently.

The preparation of tubes from the ingot that results from preparing the alloy is performed using a method comprising forging followed by quenching, drawing, and cold rolling with intermediate annealing operations, with all of the annealing operations being performed at a temperature below the α→α+β transus temperature of the alloy, i.e. generally below 600° C. These heat treatments at relatively low temperature make it possible to obtain good resistance to corrosion under normal service conditions, including a final recrystallization treatment for obtaining good resistance to creep.

Another condition that is necessary for solving the problem posed is to ensure that the outside surface of the tube has very low roughness Ra, less than or equal to 0.5 μm, preferably less than or equal to 0.3 μm. Appropriately implementing the above-mentioned mechanical polishing enables this result to be obtained.

It is already known that the high degree of surface roughness on a cladding tube degrades its resistance to corrosion in a reactor. Authors have shown that polishing E110 type binary alloys having 1% niobium enables the appearance of nodular corrosion to be slowed down. Nevertheless, at high temperature (1000° C.), such corrosion cannot be avoided (L. Yegorova et al.: LOCA Behavior of E110 alloy, Nuclear Safety Research Conference, Washington D.C., 20-22.X.2003).

The inventors have shown that such mechanical polishing, leading to roughness Ra on the surface of the tube that is less than or equal to 0.5 μm and preferably less than or equal to 0.3 μm, in association with a composition for the tube and a preparation of the tube in compliance with the above description, makes it possible to obtain the desired results in terms of ability to withstand corrosion at high temperature.

Figure 2:
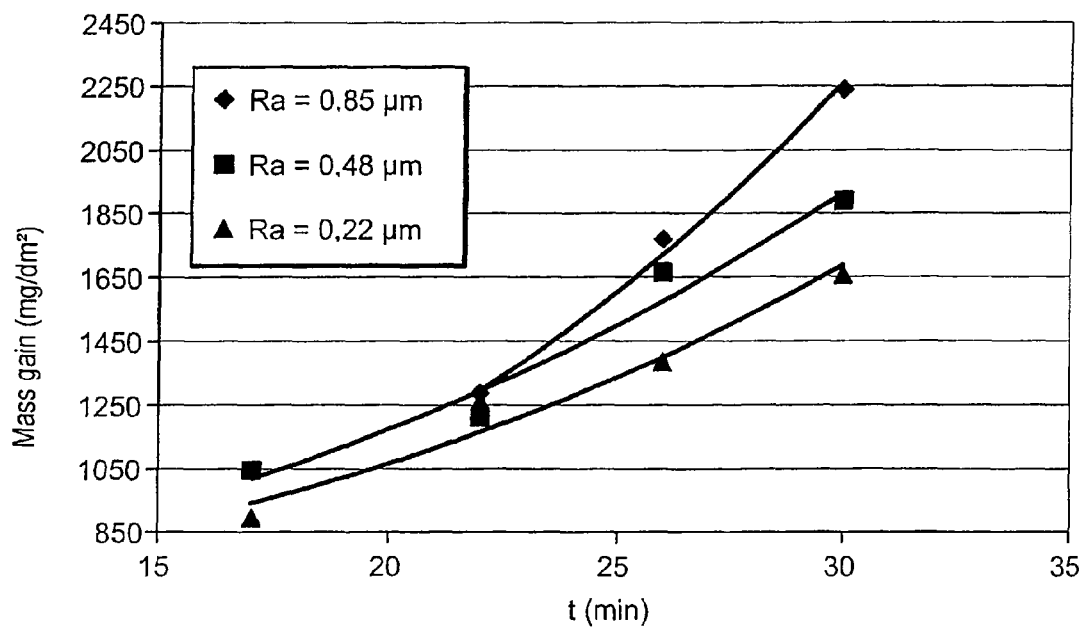
FIG. 2 shows the mass gain of alloy samples of the invention as a function of the roughness of the outside surface of the tube, during oxidation testing in air at 1020° C.

FIG. 2 shows the results of measurements on the oxidation kinetics of a zirconium alloy tube containing:
Nb=0.94%;
Sn<30 ppm;
C=42 ppm;
Cr=47 ppm;
Fe=328 ppm;
Hf=42 ppm;
O=1467 ppm;
S=13 ppm; and
F<1 ppm;

at 1020° C. in air, for different roughness.

After 22 minutes of testing, the sample having Ra=0.85 μm saw its oxidation kinetics accelerate considerably. For an Ra of 0.48 μm, the phenomenon was observed only in highly attenuated manner. Finally, for an Ra of 0.22 μm, the oxidation kinetics were practically linear. It is considered that with roughness greater than 0.50 μm, the oxidation kinetics correspond to sensitivity to corrosion that no longer enables the problem posed to be solved in satisfactory manner.

It is also advisable to perform mechanical polishing on the inside surface of the tube. The low roughness and the elimination of fluorine contamination that are obtained by such polishing are also beneficial in terms of reducing oxidation, and also for reducing corrosion under stress of the kind that is associated with interaction between the tube, and the fuel pellets it contains. This polishing should preferably give the inside surface of roughness Ra that is less than or equal to 0.4 μm.

The invention claimed is:

1. A method of manufacturing a fuel cladding tube for a nuclear reactor, the method comprising:
preparing an ingot of zirconium alloy consisting of, in percentages by weight:
0.8%≦Nb≦2.8%;
traces≦Sn≦0.65%;
0.015%≦Fe≦0.40%;
C≦100 ppm;
600 ppm≦O≦2300 ppm;
5 ppm≦S≦100 ppm;
Cr+V≦0.25%;
Hf≦75 ppm; and
F≦1 ppm;
the balance being zirconium and impurities that result from preparation;
forging the ingot followed by quenching, drawing, and thermomechanical treatments including cold rolling with intervening intermediate annealing, all of the intermediate annealing operations being performed at a temperature below the α→α+β transus temperature of the alloy, and terminating with recrystallization annealing and obtaining a tube; and
performing mechanical polishing of an outside surface of the tube to give it roughness Ra less than or equal to 0.5 μm.

2. The method according to claim 1, further comprising descaling the outside surface of the tube prior to performing mechanical polishing.

3. A method according to claim 1, wherein the sulfur content of the ingot lies in the range 8 ppm to 35 ppm.

4. The method according to claim 1, wherein the oxygen content of the ingot lies in the range 900 ppm to 1800 ppm.

5. The method according to claim 1, wherein the iron content of the ingot lies in the range 0.020% to 0.35%.

6. The method according to claim 1, wherein the intermediate annealing operations are performed at temperatures less than or equal to 600° C.

7. The method according to claim 1, wherein the roughness Ra imparted to the outside surface of the tube after polishing is less than or equal to 0.3 μm.

8. The method according to claim 1, further comprising performing mechanical polishing of an inside surface of the tube.

9. The method according to claim 8, wherein the mechanical polishing of the inside surface of the tube imparts a roughness Ra to the inside surface of the tube that is less than or equal to 0.4 μm.

10. A fuel cladding tube for a nuclear reactor, consisting of, in percentages by weight:
0.8%≦Nb≦2.8%;
traces≦Sn≦0.65%;
0.015%≦Fe≦0.40%;
C≦100 ppm;
600 ppm≦O≦2300 ppm;
5 ppm≦S≦100 ppm;
Cr+V≦0.25%;
Hf≦75 ppm; and
F≦1 ppm;
the balance being zirconium and impurities that result from preparation;
wherein an outside surface of the tube has roughness Ra less than or equal to 0.5 μm, obtained by mechanical polishing.

11. The tube according to claim 10, wherein the sulfur content lies in the range 8 ppm to 35 ppm.

12. The tube according to claim 10, wherein the oxygen content lies in the range 900 ppm to 1800 ppm.

13. The tube according to claim 10, wherein the iron content lies in the range 0.020% to 0.35%.

14. The tube according to claim 10, wherein the outside surface has roughness Ra less than or equal to 0.3 μm.

15. The tube according to claim 10, wherein an inside surface of the tube has roughness Ra less than or equal to 0.4 μm, obtained by mechanical polishing.

* * * * *